US009013905B2

(12) United States Patent
Zeng et al.

(10) Patent No.: US 9,013,905 B2
(45) Date of Patent: Apr. 21, 2015

(54) THREE-PHASE 48-PULSE RECTIFIER TRANSFORMER

(75) Inventors: Qinggan Zeng, Jiangsu (CN); Bin Cao, Jiangsu (CN); Zhaowei Ma, Jiangsu (CN); Yingping Wang, Jiangsu (CN)

(73) Assignee: Jiangsu Huapeng Transformer Co., Ltd. (CN)

( * ) Notice: Subject to any disclaimer, the term of this patent is extended or adjusted under 35 U.S.C. 154(b) by 66 days.

(21) Appl. No.: 14/007,274

(22) PCT Filed: Jan. 19, 2012

(86) PCT No.: PCT/CN2012/070580
§ 371 (c)(1),
(2), (4) Date: Sep. 24, 2013

(87) PCT Pub. No.: WO2012/129980
PCT Pub. Date: Oct. 4, 2012

(65) Prior Publication Data
US 2014/0015629 A1    Jan. 16, 2014

(30) Foreign Application Priority Data

Mar. 29, 2011  (CN) .......................... 2011 1 0075728
Jun. 28, 2011  (CN) .......................... 2011 1 0176569

(51) Int. Cl.
| H02M 7/06 | (2006.01) |
| H01F 30/14 | (2006.01) |
| H01F 30/12 | (2006.01) |
| H01F 38/06 | (2006.01) |
| H02P 13/06 | (2006.01) |

(52) U.S. Cl.
CPC ............... *H01F 30/14* (2013.01); *H01F 30/12* (2013.01); *H01F 38/06* (2013.01); *H02M 7/06* (2013.01); *H02P 13/06* (2013.01)

(58) Field of Classification Search
CPC ....... H02M 7/066; H02M 7/068; H02M 7/08; H02M 5/005; H02M 5/14; H02M 7/006; H02M 7/10; H02M 7/493
USPC .................................... 363/87, 125, 126, 129
See application file for complete search history.

(56) References Cited

U.S. PATENT DOCUMENTS

| 2,056,655 | A | * | 10/1936 | Ehrensperger | 363/83 |
| 2,082,015 | A | * | 6/1937 | Ludwig et al. | 363/64 |
| 2,134,580 | A | * | 10/1938 | Rose | 363/52 |
| 2,193,585 | A | * | 3/1940 | Evans | 363/3 |
| 2,218,383 | A | * | 10/1940 | Herskind | 363/11 |
| 2,221,524 | A | * | 11/1940 | Read | 363/94 |
| 2,820,189 | A | * | 1/1958 | Uhlmann | 363/71 |
| 4,030,017 | A | * | 6/1977 | Brown | 363/45 |
| 4,807,105 | A | * | 2/1989 | Varjasi et al. | 363/68 |
| 4,866,591 | A | * | 9/1989 | Cook et al. | 363/67 |
| 4,870,557 | A | * | 9/1989 | Stacey | 363/43 |
| 5,455,759 | A | * | 10/1995 | Paice | 363/126 |
| 5,574,631 | A | * | 11/1996 | Nelson et al. | 363/40 |
| 5,781,428 | A | * | 7/1998 | Paice | 363/126 |
| 6,101,113 | A | * | 8/2000 | Paice | 363/126 |
| 2002/0015320 | A1 | * | 2/2002 | Mochikawa et al. | 363/125 |
| 2002/0186112 | A1 | * | 12/2002 | Kamath | 336/5 |
| 2006/0198171 | A1 | * | 9/2006 | Samodell | 363/41 |
| 2007/0236969 | A1 | * | 10/2007 | Cottingham | 363/39 |
| 2008/0165553 | A1 | * | 7/2008 | Swamy | 363/67 |
| 2008/0205101 | A1 | * | 8/2008 | Kleinecke et al. | 363/70 |
| 2008/0278967 | A1 | * | 11/2008 | Furmanczyk | 363/3 |
| 2009/0251932 | A1 | * | 10/2009 | Owen | 363/44 |
| 2010/0073970 | A1 | * | 3/2010 | Abolhassani et al. | 363/37 |
| 2010/0176755 | A1 | * | 7/2010 | Hoadley et al. | 318/105 |
| 2011/0216564 | A1 | * | 9/2011 | Swamy | 363/126 |

FOREIGN PATENT DOCUMENTS

| CN | 201251988 | 6/2009 | ............. H01F 27/28 |
| CN | 101635198 | 1/2010 | ............. H01F 30/04 |
| CN | 102013817 | 4/2011 | ............. H01F 27/28 |
| CN | 102185495 | 9/2011 | ............. H01F 27/28 |
| CN | 102201749 | 9/2011 | ............. H01F 27/28 |
| CN | 202034912 | 11/2011 | ............. H01F 27/28 |
| CN | 202168000 | 3/2012 | ............. H01F 27/28 |
| JP | H05305453 | 11/1993 | ............. B23K 11/24 |

OTHER PUBLICATIONS

PCT International Search Report issued in corresponding application No. PCT/CN2012/070580, dated Apr. 26, 2012 (7 pgs).
Zhu et al., "Study of an Equivalent 48 Pulse Rectifier," Low Voltage Apparatus, Aug. 15, 2011, No. 15, pp. 37-40, Abstract only (2pgs).

\* cited by examiner

*Primary Examiner* — Timothy J Dole
*Assistant Examiner* — Yusef Ahmed
(74) *Attorney, Agent, or Firm* — Hayes Soloway P.C.

(57) ABSTRACT

A three-phase 48-pulse rectifier transformer includes two 24-pulse rectifier transformers phase-shifted through valve-side output windings. Each 24-pulse rectifier transformer has two sets of grid-side input windings and four sets of valve-side output windings. The two sets of grid-side input windings are connected in parallel and axially arranged in a split manner. Among the four sets of valve-side output windings, two sets of valve-side output windings are radially arranged in a split manner corresponding to one set of grid-side input windings, and the other two sets of valve-side output windings are also radially arranged in a split manner corresponding to the other set of grid-side input windings. The two sets of valve-side output windings that are radially split and the other two sets of valve-side output windings that are radially split are axially arranged in a split manner. The grid-side input windings of the two 24-pulse rectifier transformers are phase-shifted with respect to each other. In this way, a uniform difference of 7.5° is produced in voltages of the eight sets of valve-side output windings of the two 24-pulse rectifier transformers, and the eight sets of valve-side output windings of the two 24-pulse rectifier transformers are correspondingly connected to rectifiers to form a uniform 48-pulse rectifier transformer, which not only reduces the harmonic current generated by the rectifier, but also improves the load capacity of the rectifier.

13 Claims, 14 Drawing Sheets

L1+S1(30°+11.25°)         L2+S2(30°-18.75°)

L3+S3(30°-11.25°)         L4+S4(30°+18.75°)

L1+S1(30°+3.75°)          L2+S2(30°-26.25°)

L3+S3(30°-3.75°)          L4+S4(30°+26.25°)

transformer I

H1(30°+7.5°)

L1+S1(30°+11.25°)

L2+S2(30°-18.75°)

L3+S3(30°-11.25°)

L4+S4(30°+18.75°)

transformer II

H2(30°-7.5°)

L5+S5(30°+11.25°)

L6+S6(30°-18.75°)

L7+S7(30°-11.25°)

L8+S8(30°+18.75°)

THREE-PHASE 48-PULSE RECTIFIER TRANSFORMER

FIELD OF THE INVENTION

The invention relates to a rectifier transformer, especially a rectifier transformer used for variable flow.

BACKGROUND OF THE INVENTION

A rectifier transformer and a rectifier are generally used to form a rectifying circuit in the existing technology in order to convert AC power supply into DC power supply. FIG. 1 is the six-pulse wave bridge rectifier circuit diagram in the existing technology. As shown in FIG. 1, the rectifier transformer and the rectifier form a rectifier unit. Within an AC cycle or a 360° electric angle, the DC voltage Vdc contains six pulse ripples, and the electric angle interval of each ripple is 60°. During rectification, the rectifier will transmit a large quantity of harmonic currents to the power grid. In order to reduce the harmonic currents transmitted to the power grid, one of effective methods is to connect multiple rectifier units in parallel; wherein, the valve side voltage of each transformer shall be phase-shifted, and the harmonic currents between the connected rectifiers in parallel can be mutually counteracted on the power grid side. Two units form a 12-pulse rectification; four units form a 24-pulse rectification; and eight units form a 48-pulse rectification, etc.

FIG. 2 is the 12-pulse rectifier circuit composed diagram of two 6-pulse wave bridge rectifier units connected in parallel in the existing technology. As shown in FIG. 2, the phase angle difference between valve-side winding) L1 (0° voltage and valve-side winding) L2 (30° voltage is 30° in the 12-pulse rectification composed of two rectifier units connected in parallel. Within an AC cycle, the DC voltage Vdc contains 12 pulse ripples, and the electric angle interval of each ripple is 30°. When rectifier units are connected in parallel, the valve-side winding phase angle voltage difference (caused by different voltage phase angles) generates a ring current (sixfold power frequency) between parallel connection units. This sort of ring current caused by phase angle voltage difference will impact or interfere with normal working of rectifiers. The balance reactor I-T in FIG. 2 is one of effective methods for reducing the ring current caused by phase angle voltage difference.

Another sort of 12-pulse rectification mode is serial connection of two rectifier units. Compared with the parallel connection rectification mode, the serial connection rectification mode does not have the parallel connection ring current between rectifiers, but the resistance loss of serial connection rectifiers is increased by 100%, so the serial connection rectification mode is less used actually.

FIG. 3 is the schematic diagram of two sets of valve-side output windings that are axially split of one transformer (one phase, no iron core indicated) in the existing technology. As shown in FIG. 3, one transformer includes two sets of valve-side output windings; wherein, L1 and L2 are two sets of valve-side output windings that are radially (radius direction) split and H is the gird-side input winding, thus both the rectifier transformer cost and the floor area of the transformer are reduced. However, for the two sets of valve-side output windings of the same iron core, when L1 and L2 are connected in star shape and triangle shape respectively, the transformation ratio voltage difference (voltage deviation of star-shaped and triangular windings 1:√3) caused by taking the number of turns of star-shaped and triangular windings as an integer generates another sort of ring current (direct current) between parallel connection rectifiers. As shown in FIG. 3, L1 and L2 are radially (radius direction) split windings, the magnetic leakage impedance (the impedance restricting transformation ratio voltage difference from generating parallel connection ring current) between radially split valve-side windings is small, thus easily leading to a large transformation ratio voltage difference ring current. The transformation ratio voltage difference ring current will result in current imbalance (or inequality) between parallel connection rectifiers. On one hand, current imbalance will reduce the operational capability of parallel connection rectifying devices; on the other hand, the quintuple and septuple harmonic currents on the grid-side cannot be completely counteracted mutually and the uncounteracted quintuple and septuple harmonic currents are still transmitted to the power grid. Therefore, the transformation ratio voltage difference ring current must be reduced and controlled in the design and manufacture of parallel connection rectifier units.

FIG. 4 is the schematic diagram of two sets of valve-side output windings that are axially split of one transformer (one phase, and no iron core indicated) in the existing technology. As shown in FIG. 4, the structure of two sets of valve-side output windings of the transformer are axially split windings. L1 and L2 in FIG. 4 are two sets of valve-side axially (circle's center axis) split output windings, and H is parallel connection axially split input windings on the grid-side. The magnetic leakage impedance between axially split windings on the valve-side is large and can effectively restrict the ring current generated by transformation ratio voltage difference and phase angle voltage difference.

1500V DC power supply rectifier transformers for metro traction use axially dual split windings. Each rectifier transformer and two rectifiers form a 12-pulse rectification. There are totally two sets of 12-pulse rectifier units. The grid-side windings of the rectifier transformer include phase shift coils. With them, the phase angle of the valve-side voltage of the two sets of 12-pulse rectifying devices is phase-shifted by 15°. Two sets of 12-pulse rectifying devices are connected in parallel to form a 24-pulse rectification. FIG. 5 is 24-pulse rectification circuit diagram composed of two sets of 12-pulse rectifying devices connected in parallel in the existing technology. As shown in FIG. 5, within an AC cycle, the DC voltage Vdc contains 24 pulse ripples, and the electric angle interval of each ripple is 15°. Due to the magnetic leakage impedance between the axially split valve-side windings of the rectifier transformer is large, and the appropriate number of turns of star-shaped and triangular windings is selected, a balance reactor between parallel connection rectifiers may not be used. However, the ring current (or current inequality) between the rectifiers generated by the transformation ratio voltage difference of the star-shaped and triangular windings on the valve-side causes that the 24-pulse rectifier system still transmit the uncounteracted quintuple and septuple harmonic currents to the power grid.

At present, there is not a feasible technical scheme for realizing one rectifier transformer composed of the parallel connection 24-pulse rectification with four sets of valve-side windings and effectively controlling (or eliminating) ring currents and harmonic currents transmitted to the power grid. The main restricting factors are as follows: the magnetic leakage impedance of the radially split windings among the four sets of valve-side windings is small, and the transformation ratio voltage difference generated by taking the number of turns of star-shaped and triangular windings as an integer generates a large parallel connection ring current between rectifiers, so that rectifier units are unable to work normally and transmit large harmonic currents to the power grid.

For the 48-pulse rectification, the currently existing method is to form a 48-pulse rectification through phase shifting and parallel connection of four sets of 12-pulse rectifying devices. Four sets of 12-pulse rectifying devices include four rectifier transformers with two valve-side output windings. The floor area of rectifier transformers and the integral engineering cost can be reduced by reducing the number of rectifier transformers, i.e. increasing the set number of valve-side output windings of a single rectifier transformer and ensuring the same rectification effect.

DISCLOSURE OF THE INVENTION

To solve the shortcomings of the existing technology, the invention intends to provide a sort of three-phase 48-pulse rectifier transformer composed of two parallel connection 24-pulse rectifier transformers, so as to reduce the harmonic current generated by rectifiers and increase the load capacity of rectifiers.

The three-phase 48-pulse rectifier transformer provided by the invention consists of two 24-pulse rectifier transformers with phase-shifted valve-side output windings so as to achieve the above purpose.

Wherein, the single 24-pulse rectifier transformer includes two sets of grid-side input windings and four sets of valve-side output windings. The two sets of grid-side input windings are connected in parallel and arranged in an axially split manner. The two sets of valve-side output windings among the four sets of valve-side output windings are radially arranged with one set of grid-side input winding in a split manner, and the other two sets of valve-side output windings are also radially arranged with the other one set of grid-side input winding in a split manner. The two sets of valve-side output windings radially split mutually are arranged in an axially split manner with the other two sets of radially split valve-side output windings.

The grid-side input windings of the two 24-pulse rectifier transformers are phase-shifted mutually, so that the uniform difference between the voltages of the eight sets of valve-side output windings of the two 24-pulse rectifier transformers is 7.5°, and the eight sets of valve-side output windings of the two 24-pulse rectifier transformers are connected with rectifiers correspondingly to form a uniform 48-pulse rectifier transformer.

Wherein, the four sets of valve-side output windings of the single 24-pulse rectifier transformer are phase-shifted symmetrically. Each set of valve-side output windings includes main windings and phase shift windings. The number of turns of main windings between the corresponding radially arranged valve-side output windings is equal; the number of turns of phase shift windings is equal; using the symmetrical phase shift connection method, the phase shift angle is equal but the direction is contrary.

Wherein, the voltage of the two sets of corresponding radially split valve-side output windings of the single 24-pulse rectifier transformer is equal and the mutual phase shift angle between them is 7.5°. The voltage of the other two sets of corresponding radially split valve-side windings is also equal and the mutual phase shift angle between them is 22.5°. The mutual phase shift angle among the four sets of valve-side output windings is 7.5°, 15°, 22.5° and 15° respectively. The phase shift angle between the axially arranged valve-side output windings is 15° or equivalent 45°. The transformation ratio difference in the number of turns of the axially split valve-side output windings is less than 1% on the premise that the number of turns of the main windings between the corresponding radially valve-side output windings is equal and the number of turns of phase shift windings is equal. The mutual phase shift between the gird-side input windings of the two 24-pulse rectifier transformers is 30°.

Wherein, the voltage of the two sets of corresponding radially split valve-side output windings of the single 24-pulse rectifier transformer is equal and the mutual phase shift angle between them is 15°. The voltage of the other two sets of corresponding radially split valve-side windings is also equal and the mutual phase shift angle between them is 15°. The mutual phase shift angle among the four sets of valve-side output windings is 15°, 15°, 15° and 15° respectively. The phase shift angle between the axially arranged valve-side output windings is 15° or equivalent 45°. The transformation ratio difference in the number of turns of the axially split valve-side output windings is less than 1% on the premise that the number of turns of the main windings between the corresponding radially arranged valve-side output windings is equal and the number of turns of phase shift windings is equal. The mutual phase shift between the gird-side input windings of the two 24-pulse rectifier transformers is 7.5° or 22.5°.

Wherein, the voltage of the two sets of corresponding radially split valve-side output windings of the single 24-pulse rectifier transformer is equal and the mutual phase shift angle between them is 22.5°. The voltage of the other two sets of corresponding radially split valve-side windings is also equal and the mutual phase shift angle between them is 22.5°. The mutual phase shift angle among the four sets of valve-side output windings is 22.5°, 7.5, 22.5° and 7.5° respectively. The phase shift angle between the axially arranged valve-side output windings is 7.5°. The transformation ratio difference in the number of turns of the axially split valve-side output windings is less than 1% on the premise that the number of turns of the main windings between the corresponding radially arranged valve-side output windings is equal and the number of turns of phase shift windings is equal. The mutual phase shift between the gird-side input windings of the two 24-pulse rectifier transformers is 15° or 45°.

Wherein, the voltage of the two sets of corresponding radially split valve-side output windings of the single 24-pulse rectifier transformer is equal and the mutual phase shift angle between them is 7.5°. The voltage of the other two sets of corresponding radially split valve-side windings is also equal and the mutual phase shift angle between them is 7.5°. The mutual phase shift angle among the four sets of valve-side output windings is 7.5°, 22.5°, 7.5° and 22.5° respectively. The phase shift angle between the axially arranged valve-side output windings is 22.5°. The transformation ratio difference in the number of turns of the axially split valve-side output windings is less than 1% on the premise that the number of turns of the main windings between the corresponding radially arranged valve-side output windings is equal and the number of turns of phase shift windings is equal. The mutual phase shift between the gird-side input windings of the two 24-pulse rectifier transformers is 15° or 45°.

Wherein, the mutual phase shift angle between the two sets of corresponding radially split valve-side output windings is 30°. The mutual phase shift angle between the other two sets of corresponding radially split valve-side windings is also 30°. The phase shift angle between the axially split windings is 15° or 7.5°. The difference in the voltage values of the four sets of valve-side output windings is less than 0.5%.

Wherein, when the phase shift angle between the axially split windings of the single 24-pulse rectifier transformer is 15°, the mutual phase shift angle among the four sets of valve-side output windings is 15°, 15°, 15° and 15° respectively and is uniformly equal. The mutual phase shift between the gird-side input windings of the two 24-pulse rectifier transformers is 7.5° or 22.5°.

Wherein, the two sets of corresponding radially split valve-side output windings are phase-shifted connected, and phase-shifted respectively, after phase shifted, the phase angle difference of the two sets of valve-side output windings is 30°. The other two sets of corresponding radially split valve-side output windings are phase-shifted connected, and phase-shifted respectively, after phase shifted, the phase angle difference of the two sets of valve-side output windings is 30°.

Wherein, the two sets of corresponding radially split valve-side output windings are connected in triangular shape and star shape respectively, and their mutual phase angle difference is 30°. The other two sets of corresponding radially split valve-side output windings are both connected in side-extended triangular shape and phase-shifted by +15° and −15° respectively, and their mutual phase angle difference is 30°.

Wherein, when the phase shift angle between the axially split windings of the single 24-pulse rectifier transformer is 7.5°, the mutual phase shift angle among the four sets of valve-side output windings is 22.5°, 7.5°, 22.5° and 7.5° respectively and is not uniformly equal. The mutual phase shift between the gird-side input windings of the two 24-pulse rectifier transformers is 15°.

Wherein, the two sets of corresponding radially split valve-side output windings are both connected in side-extended triangular shape and phase-shifted by +11.25° and −18.75° respectively. The other two sets of corresponding radially split valve-side output windings are both connected in side-extended triangular shape and phase-shifted by −11.25° and +18.75° respectively.

Wherein, the two sets of corresponding radially split valve-side output windings are both connected in side-extended triangular shape and phase-shifted by +3.75° and −26.25° respectively. The other two sets of corresponding radially split valve-side output windings are both connected in side-extended triangular shape and phase-shifted by −3.75° and +26.25° respectively.

The 48-pulse rectifier transformer of the present invention can be used to solve the technical problem about small magnetic leakage impedance between the radially split valve-side windings of rectifier transformers, large parallel connection ring currents generated by the transformation ratio voltage difference caused by taking the number of turns of star-shaped and triangular windings as an integer and transmission of large harmonic currents to the power grid. By using the 48-pulse rectifier transformer, the harmonic currents generated by rectifiers can be reduced and the load capacity of rectifiers can be increased. At grid-side, the 5-fold, 7-fold, 11-fold, 13-fold, 17-fold, 19-fold, 23-fold and 25-fold harmonic currents of the parallel connection 48-pulse rectifier system composed of two rectifier transformers can be mutually counteracted, so as to reduce the floor area of rectifier transformers and the integral engineering cost or improve the quality of the power grid.

Other features and advantages of the invention will be described in the subsequent specification, and some parts will become obvious from specification or can be known by implementing the invention.

DESCRIPTION OF THE DRAWINGS

The drawings are used to further understand the invention and form a part of the specification. In addition, the drawings together with the examples of the invention are used to explain the invention and do not constitute any limits to the invention. In the drawings.

DETAILED DESCRIPTION OF THE EMBODIMENTS

The preferred examples are described with reference to the drawings. It shall be understood that the preferred examples described here are used to only describe and explain the invention instead of limiting it.

Figure 1:
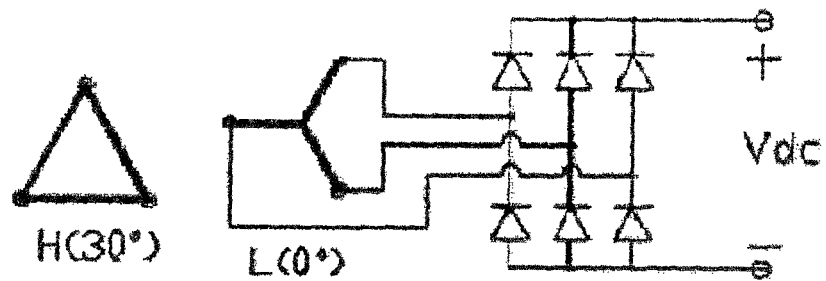
FIG. 1 is the 6-pulse wave bridge rectification circuit diagram in the existing technology.
Figure 2:
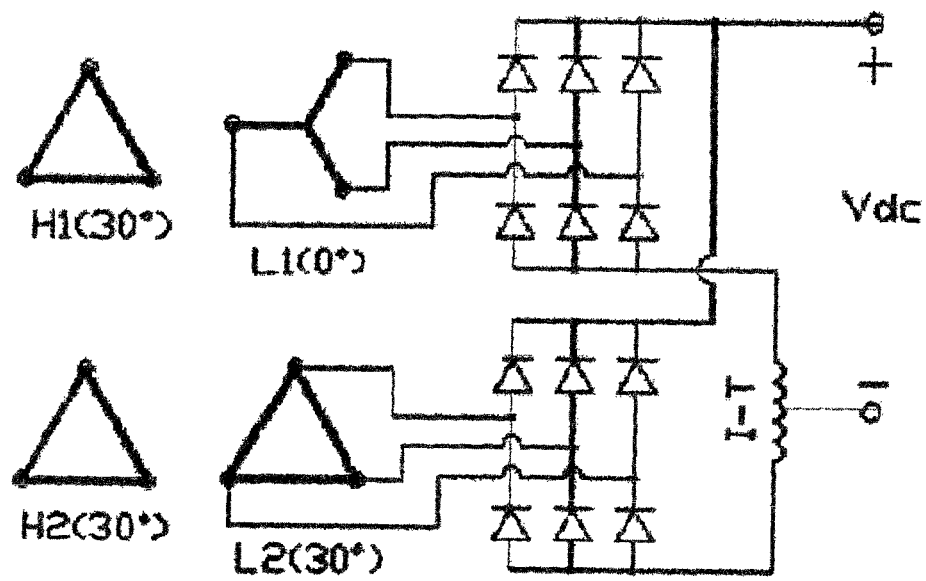
FIG. 2 is the 12-pulse rectification circuit diagram composed of two 6-pulse wave bridge rectifier units connected in parallel in the existing technology.

To better understand the technical scheme of the invention, the parallel connection 12-pulse rectification in the existing technology shown in FIG. 2 is analyzed firstly. As shown in FIG. 2, when rectifier units are connected in parallel, the phase angle voltage difference caused by different phase-shifted angles between valve-side windings generates a ring current (sixfold power frequency) among parallel connection rectifier; in general, a balance reactor is used to limit the ring current generated by phase angle voltage difference.

Figure 3:
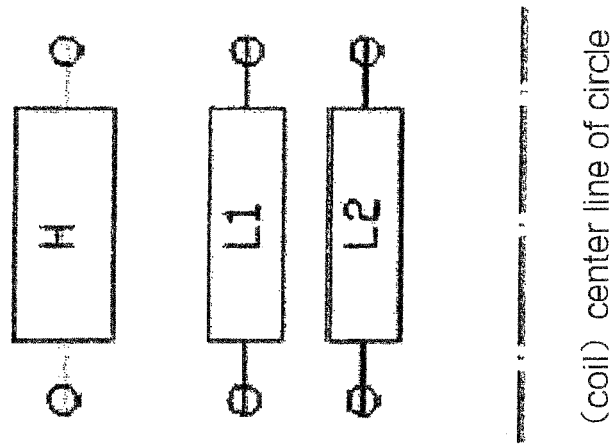
FIG. 3 is the schematic diagram of two sets of radially split valve-side output windings of one transformer in the existing technology.
Figure 4:
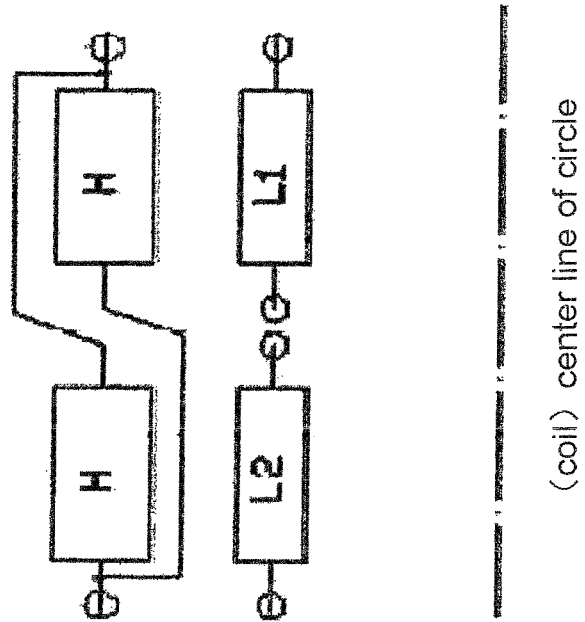
FIG. 4 is the schematic diagram of two sets of axially split valve-side output windings of one transformer in the existing technology.
Figure 5:
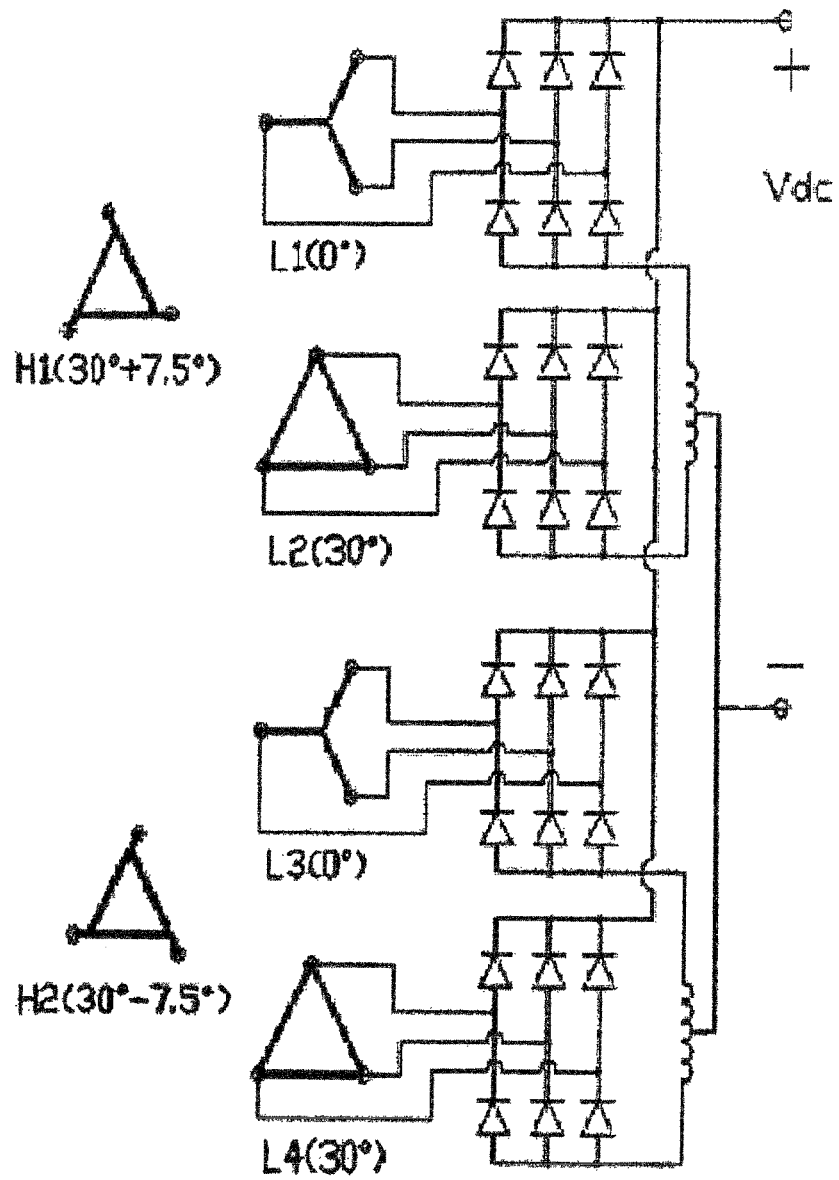
FIG. 5 is the diagram of the 24-pulse rectification circuit connected in parallel composed of two sets of 12-pulse rectifying devices in the existing technology.

The two sets of valve-side windings of one transformer (the same iron core) are connected in star shape and triangle shape respectively. The transformation ratio difference (transformation ratio voltage difference) caused by taking the number of turns of star-shaped and triangular windings as an integer leads to another sort of parallel connection ring current (direct current) between the two sets of rectifiers. The balance reactor cannot limit this sort of DC ring current. On one hand, this DC ring current leads to load current of parallel connection rectifiers imbalance; on the other hand, due to current imbalance of rectifiers, the quintuple and septuple harmonic currents on the grid-side cannot be completely counteracted mutually and the uncounteracted quintuple and septuple harmonic currents are still transmitted to the power grid. As shown in FIG. 3, the magnetic coupling coefficient of radially split valve-side windings L1 and L2 is large and then the corresponding magnetic leakage impedance of limiting ring current is small. As shown in FIG. 4, the magnetic coupling coefficient of axially split valve-side windings L1 and L2 is small and then the corresponding magnetic leakage impedance of limiting ring current is large, so as to limit the ring current caused by transformation ratio voltage difference effectively.

Figure 6:
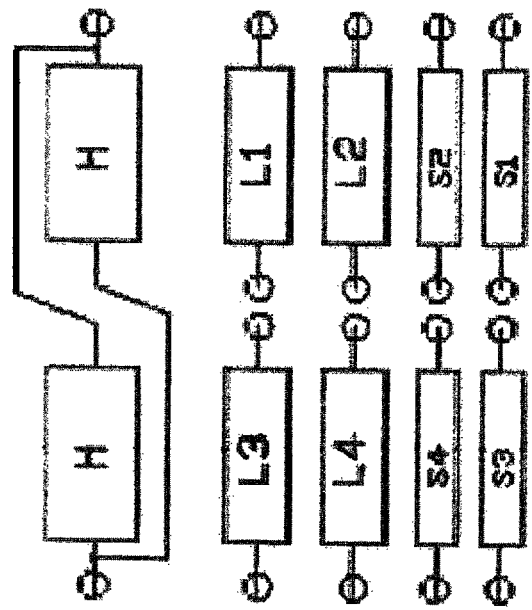
FIG. 6 is the layout schematic diagram of four sets of valve-side output windings of the 24-pulse rectifier transformer according to the invention.
Figure 7:
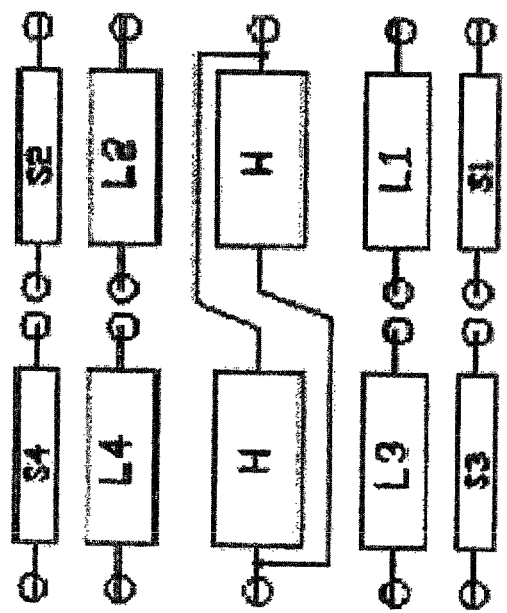
FIG. 7 is another layout schematic diagram of four sets of valve-side output windings of the 24-pulse rectifier transformer according to the invention.

FIG. 6 is a layout schematic diagram of four sets of valve-side output windings of the 24-pulse rectifier transformer according to the invention; FIG. 7 is another layout schematic diagram of four sets of valve-side output windings of the 24-pulse rectifier transformer according to the invention. As shown in FIGS. 6 and 7, the 24-pulse rectifier transformer according to the invention includes two sets of grid-side input windings (H windings) and four sets of valve-side output windings (one phase, no iron core indicated in FIGS. 6 and 7). Wherein, the two sets of grid-side input windings are connected in parallel and arranged in an axially split manner. Two sets of valve-side output windings of the four sets of valve-side output windings are corresponding radially arranged with one set of grid-side input winding in a split manner, and the other two sets valve-side output windings are also corresponding radially arranged with the other one set of grid-side input winding in a split manner. Each set of valve-side output windings includes main windings (L windings) and phase shift windings (S windings). The four sets of valve-side output windings are L1S1, L2S2, L3S3 and L4S4 respectively. L1S1 is radially arranged mutually with L2S2 in a split manner; L3S3 is radially arranged mutually with L4S4 in a split manner; L1S1 and L2S2 are axially arranged mutually with L3S3 and L4S4 in a split manner.

Figure 8:
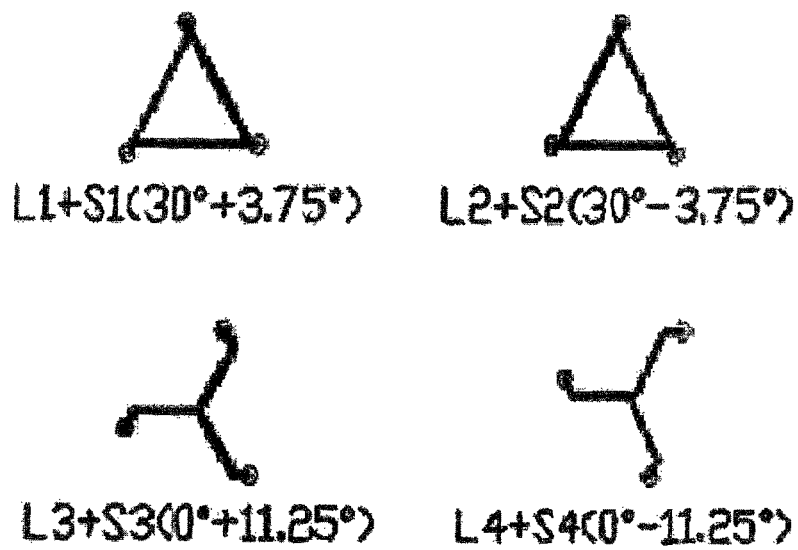
FIG. 8 is the schematic diagram of connection mode I of valve-side main windings and phase shift windings according to the invention.

The number of turns of the main windings between the radially split windings L1S1 and L2S2 is equal and the number of turns of the phase shift windings is equal; i.e., the number of turns of L1 is equal to the number of turns of L2, and the number of turns of S1 is equal to the number of turns of S2; the phase shift connection mode is symmetrical and the phase shift angle is equal but the direction is contrary, so that their voltage transformation ratio is equal and there is no transformation ratio voltage difference; therefore, there is no parallel connection DC ring current generated by transformation ratio voltage difference, such as the side-extended triangular phase shift connection windings shown in FIG. 8. Similarly, the number of turns of the main windings between the radially split windings L3S3 and L4S4 are equal and the number of turns of the phase shift windings is equal; the phase shift connection mode is symmetrical and the phase shift angle is equal but the direction is contrary; so there is no transformation ratio voltage difference.

FIG. 8 shows the Z-shaped phase shift connection windings. Select the number of turns of main windings and phase shift windings, so as to make L1S1, L2S2, L3S3 and L4S4 obtain an appropriate phase shift angle.

L1S1 and L2S2 are axially arranged with each other in a split manner; L3S3 and L4S4 are also axially arranged mutually in a split manner. Select the number of turns of main windings and phase shift windings, so as to make the voltage transformation ratio between axially split windings be approximate; e.g., the transformation ratio difference is less than 1%. Due to the magnetic leakage impedance of the limited ring current between axially split windings is large, the parallel connection DC ring current between axially split windings generated by transformation ratio voltage difference is small; e.g., it is less than 10%.

FIG. 8 is the schematic diagram of the connection method of valve-side main windings and phase shift windings according to the invention. As shown in FIG. 8, L1S1 and L2S2 are phase-shifted by +3.75° and −3.75° respectively and the phase angle difference between L1S1 and L2S2 is 7.5°, this 7.5° is the interval angle of a single pulse of the 48-pulse rectification. As shown in FIG. 8, L3S3 and L4S4 are phase-shifted by +11.25° and −11.25° respectively and the phase angle difference between L3S3 and L4S4 is 22.5°, this 22.5° is the interval angle of three pulses of the 48-pulse rectification. The phase angle difference among the four sets of valve-side windings is 7.5°, 15°, 22.5° and 15° respectively; i.e. the phase angle difference between L1S1 and L2S2 is 7.5°, the phase angle difference between L2S2 and L3S3 is 15°, the phase angle difference between L3S3 and L4S4 is 22.5° and the phase angle difference between L4S4 and L1S1 is 15°. In the three-phase bridge rectification, 60° is an equivalent cycle period, and the windings with the phase angle difference of 7.5° and −55° or the windings with the phase angle difference of 22.5° and −37.5° have an equivalent rectification effect respectively. The four sets of valve-side windings which are phase-shifted non-uniformly symmetrically can form the 24-pulse rectification with a non-uniform phase shift angle. The 24-pulse rectification with a non-uniform phase shift angle cannot completely counteract quintuple and septuple harmonic currents on the grid-side; in addition, the quintuple and septuple harmonic currents caused by the DC ring current of transformation ratio voltage difference are transmitted to the grid-side.

Figure 9:
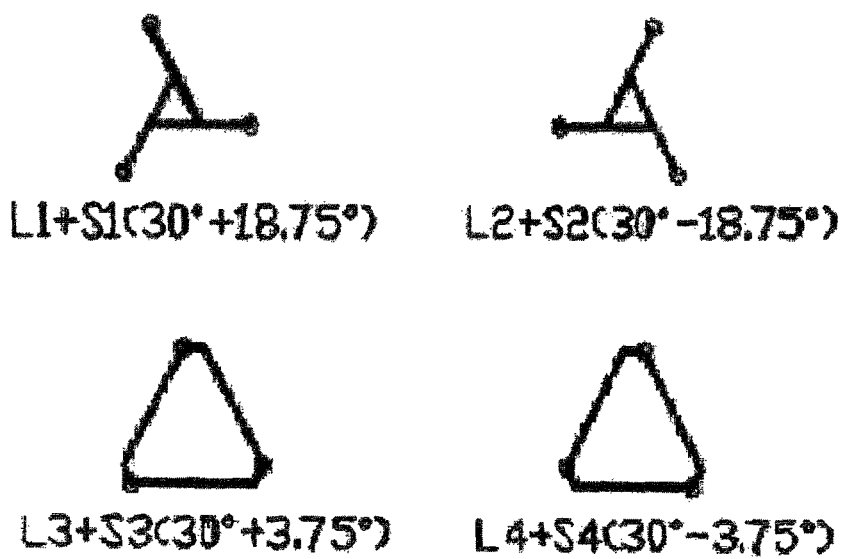
FIG. 9 is the schematic diagram of connection mode II of valve-side main windings and phase shift windings according to the invention.

FIG. 9 is the schematic diagram of another connection method of valve-side main windings and phase shift windings according to the invention. As shown in FIG. 9, the phase angle difference between L1S1 and L2S2 is 37.5°, which has an equal rectification effect to 22.5°; the phase angle difference between L3S3 and L4S4 is 7.5°; the phase angle difference among the four sets of valve-side windings is 22.5°, 15°, 7.5° and 15° respectively.

Figure 10:
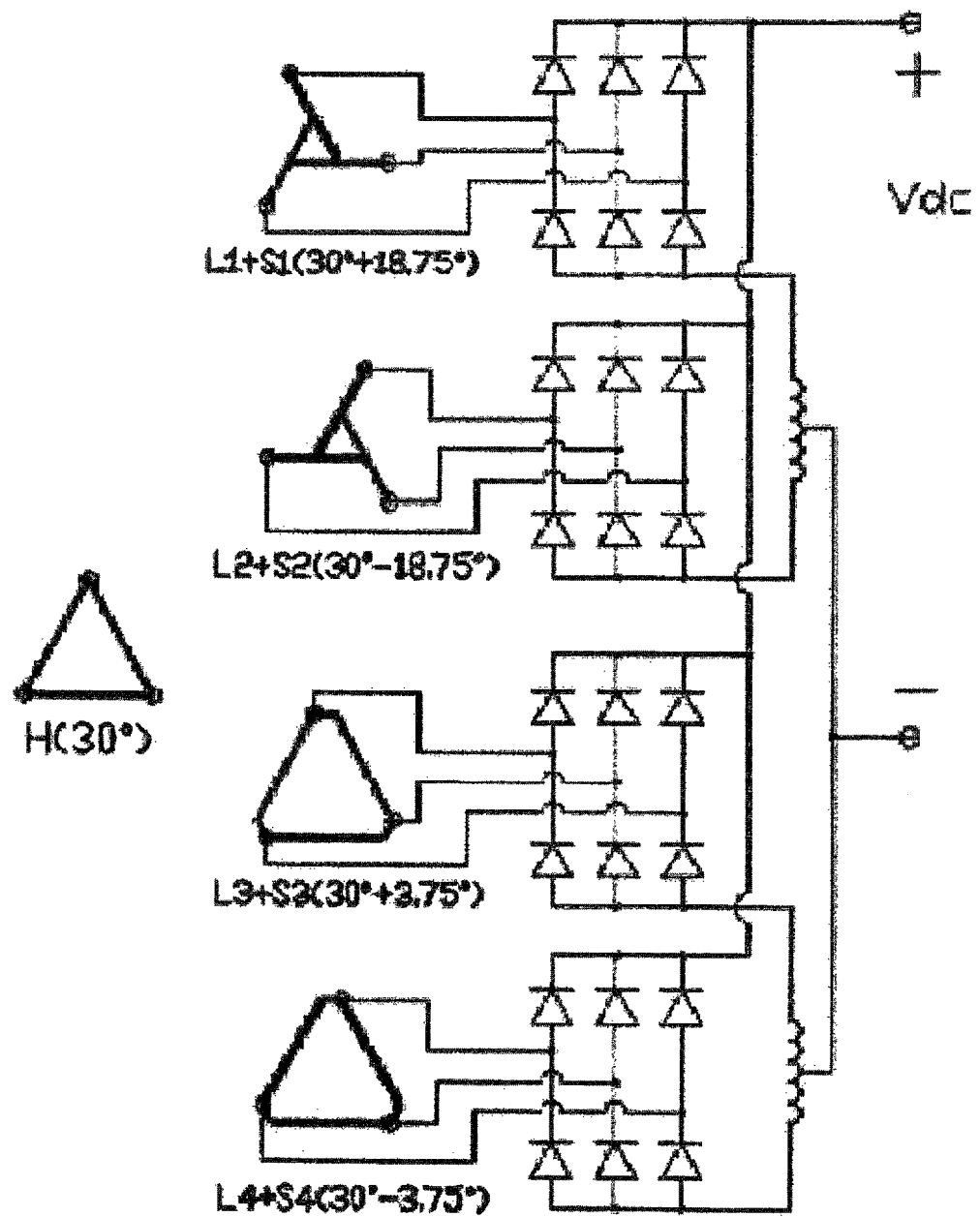
FIG. 10 is the circuit diagram of the 24-pulse rectifier transformer according to the invention.

FIG. 10 is the circuit diagram of the 24-pulse rectifier transformer according to the invention. As shown in FIG. 10, the 24-pulse rectifier circuit uses the 24-pulse rectifier transformer with the valve-side windings having a non-uniform symmetrical phase angle shown in FIG. 9, which is connected with rectifiers to form the 24-pulse rectification with a non-uniform phase shift angle.

Figure 11:
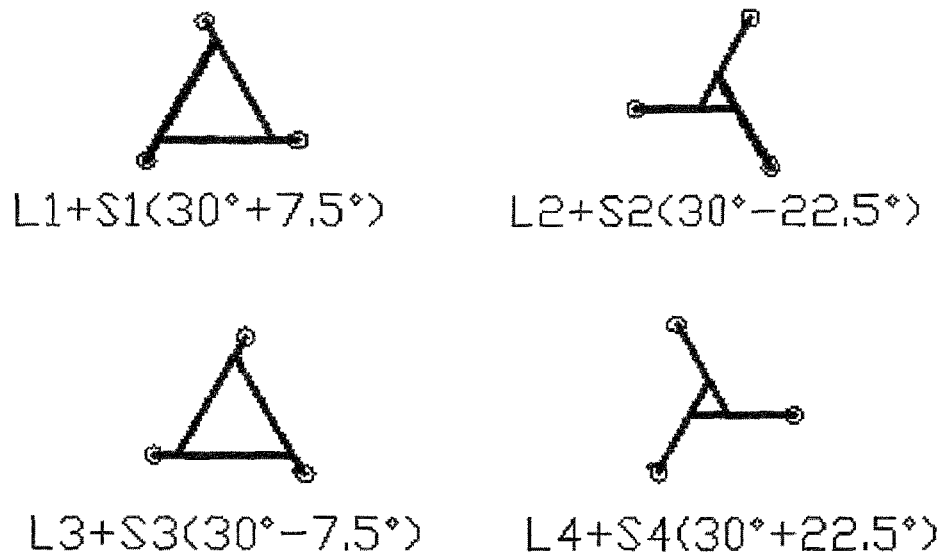
FIG. 11 is the schematic diagram of connection mode III of valve-side main windings and phase shift windings according to the invention.
Figure 12:
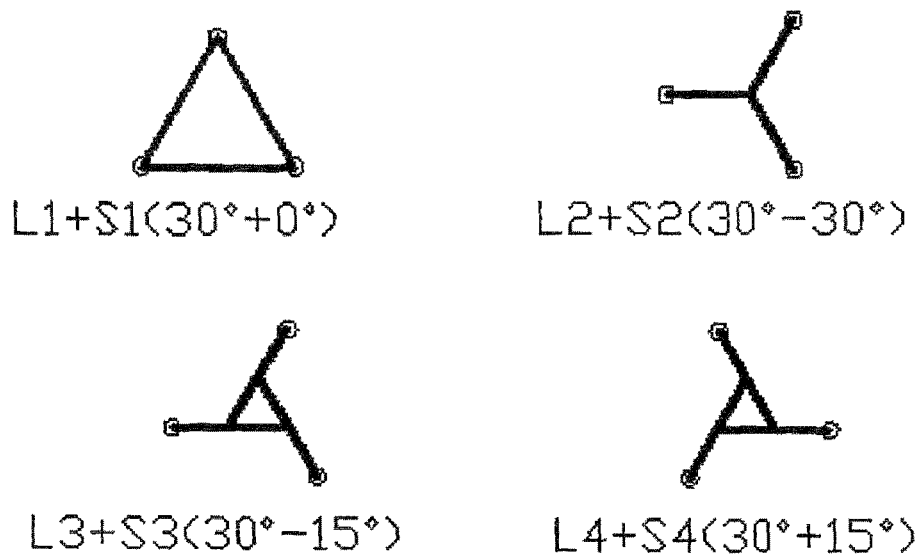
FIG. 12 is the schematic diagram of connection mode IV of valve-side main windings and phase shift windings according to the invention.

FIG. 11 is the schematic diagram of connection mode III of valve-side main windings and phase shift windings according to the invention; FIG. 12 is the schematic diagram of connection mode IV of valve-side main windings and phase shift windings according to the invention. The phase shift angle among the radially split valve-side output windings of each single 24-pulse rectifier transformer according to the invention is 30°; i.e., the phase shift angle between L1S1 and L2S2 is 30° and between L3S3 and L4S4 is 30°. The phase shift angle between radially split valve-side output windings is selected as 30°. This is because the magnetic leakage inductance of each phase of two windings is equal, the turn-on time sequence and interval of each phase is also identical at this time, so as to balance and equal the corresponding rectified current of radially split windings.

By using the phase shift connection method and phase shift angle shown in FIG. 11 or 12, the axially split windings (L1S1 and L2S2) and (L3S3 and L4S4) are phase-shifted by 15° mutually. At this time, the phase angle difference between L1S1 and L3S3 is 15°, between L3S3 and L2S2 is 15°, between L2S2 and L4S4 is 15° and between L4S4 and L1S1 is 45° (60° is the rectification equivalent cycle period, and 45° phase angle has the same effect as phase angle 15°). The phase angle difference among the four sets of valve-side windings is uniformly equal. The following table gives the parameters including the number of turns, phase shift angle, etc. of four sets of valve-side windings corresponding to FIG. 3. The deviation of the equivalent number of turns of the four sets of windings is less than 0.03%. There is also a certain deviation between the phase shift angle in the table and phase shift angle specified in the figure.

| Winding code | Number of turns of main windings | Number of turns of phase shift | Equivalent number of turns | Connection method | Phase shift angle |
|---|---|---|---|---|---|
| L1S1 | 30 | 6 | 39.345 | Regular side-extended triangle | +7.59° |
| L2S2 | 9 | 17 | 39.357 | Reverse side-extended triangle | −22.52° |
| L3S3 | 30 | 6 | 39.345 | Reverse side-extended triangle | −7.59° |
| L4S4 | 9 | 17 | 39.357 | Regular side-extended triangle | +22.52° |

Figure 13:
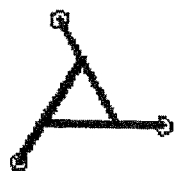
FIG. 13 is the schematic diagram of connection mode V of valve-side main windings and phase shift windings according to the invention.
Figure 13:
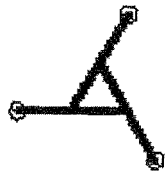
Figure 13:
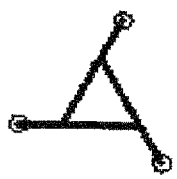
Figure 13:
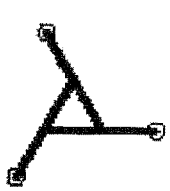
Figure 14:
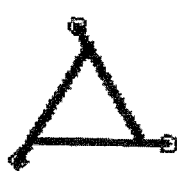
FIG. 14 is the schematic diagram of connection mode VI of valve-side main windings and phase shift windings according to the invention.
Figure 14:
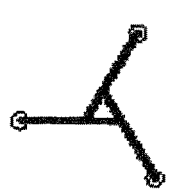
Figure 14:
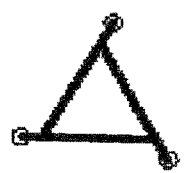
Figure 14:
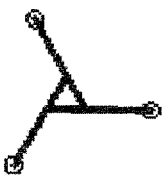

FIG. 13 is the schematic diagram of connection mode V of valve-side main windings and phase shift windings according to the invention; FIG. 14 is the schematic diagram of connection mode VI of valve-side main windings and phase shift windings according to the invention. As shown in FIGS. 13 and 14, the phase shift angles among corresponding radially split valve-side windings are all 30°; i.e. the phase angle difference between L1S1 and L2S2 is 30° and between L3S3 and L4S4 is 30°. The corresponding axially split windings (L1S1 and L2S2) and (L3S3 and L4S4) are phase-shifted by 7.5° mutually. For instance, as shown in FIG. 13, the phase angle difference between L1S1 and L3S3 is 22.5°, between L3S3 and L2S2 is 7.5°, between L2S2 and L4S4 is 37.5° (37.5° has the same effect as 22.5°) and between L4S4 and L1S1 is 7.5°. The phase angle difference among the four sets of valve-side windings is not uniformly equal. A non-uniformly equal phase shift angle is used among the four sets of valve-side windings, which can thus provide more schemes for the selection of the number of turns of main windings and phase shift windings and similarly form a uniform 48-pulse rectifier transformer. The following table gives the parameters including the number of turns, phase shift angle, etc. of four sets of valve-side windings corresponding to FIG. 17. The deviation of the equivalent number of turns of the four sets of windings is less than 0.21%. There is also a certain deviation between the phase shift angle in the table and phase shift angle specified in the figure.

| Winding code | Number of turns of main windings | Number of turns of phase shift | Equivalent number of turns | Connection method | Phase shift angle |
|---|---|---|---|---|---|
| L1S1 | 17 | 6 | 26.514 | Regular side-extended triangle | +11.30° |
| L2S2 | 10 | 10 | 26.458 | Reverse side-extended triangle | −19.10° |
| L3S3 | 17 | 6 | 26.514 | Reverse side-extended triangle | −11.30° |
| L4S4 | 10 | 10 | 26.458 | Regular side-extended triangle | +19.10° |

Figure 15:
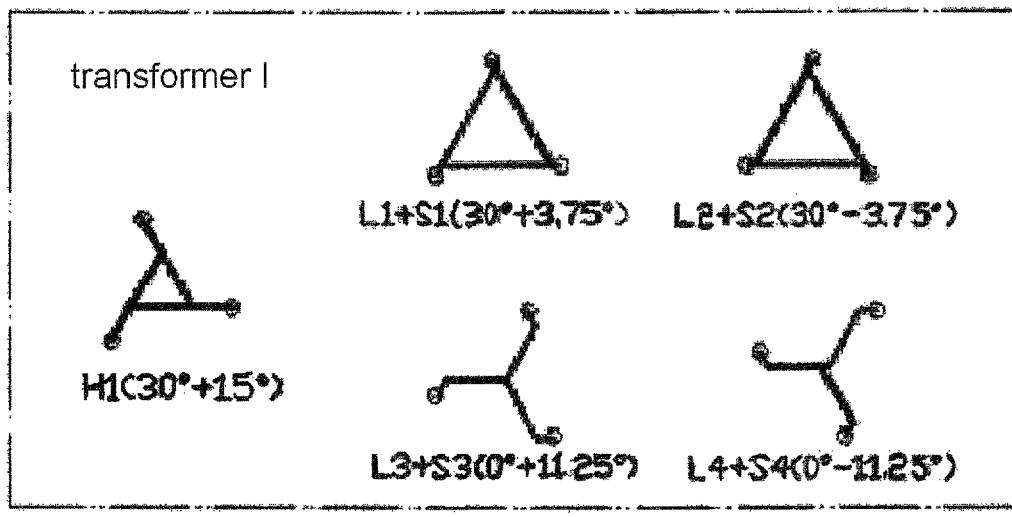
FIG. 15 is the schematic diagram of connection mode I of the windings of the 48-pulse rectifier transformer according to the invention.
Figure 15:
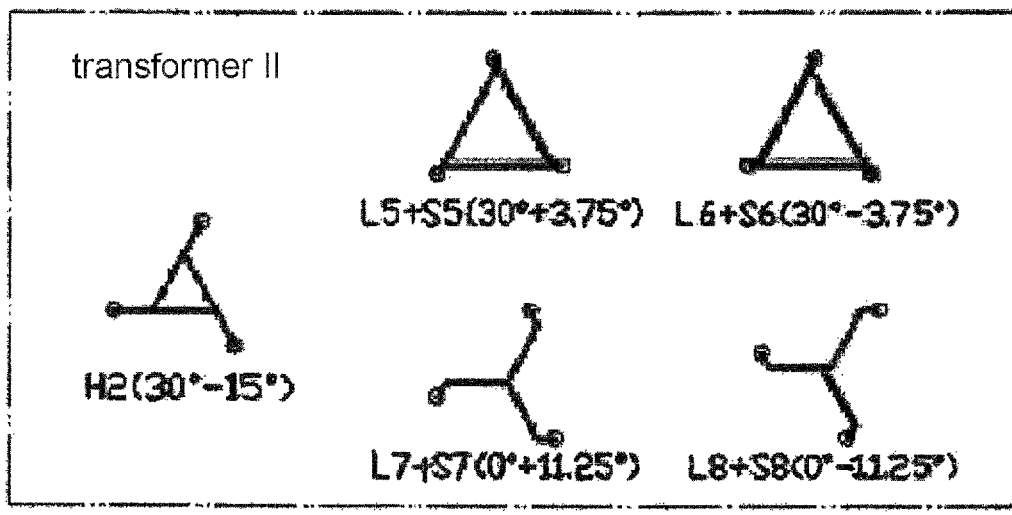

FIG. 15 is the schematic diagram of connection mode I of the windings of the 48-pulse rectifier transformer according to the invention. FIG. 15 shows the two 24-pulse rectifier transformers with valve-side windings having a non-uniform symmetrical phase shift angle. The grid-side windings of the transformers are phase-shifted respectively and the phase shift angle among them is 30°. At this time, the uniform phase angle interval among the eight sets of valve-side windings is 7.5°; i.e., the electric angle interval of a single ripple of the 48-pulse rectification is 7.5°. As shown in FIG. 15, the windings are connected with rectifiers in parallel to form a uniformly symmetrical 48-pulse rectifier system. The grid-side of each transformer contains the quintuple and septuple harmonic currents that cannot be counteracted, but the grid-side windings of the two transformers are mutually phase-shifted by 30°, so the quintuple and septuple harmonic currents between the two transformers can be completely counteracted mutually, and the 48-pulse rectifier system does not transmit quintuple or septuple harmonic currents to the power grid. The 48-pulse rectifier system composed of rectifier transformers according to the invention can eliminate the 5-fold, 7-fold, 11-fold, 13-fold, 17-fold, 19-fold, 23-fold and 25-fold harmonic currents transmitted to the power grid.

The positive and negative phase shift angles adopted by the 24-pulse rectifier transformer of the invention: +3.75° and −3.75° or equivalent +26.25° and −26.25°, +7.5° and −7.5° or equivalent +22.5° and −22.5°, +11.25° and −11.25° or equivalent +18.75° and −18.75° can be obtained by using any two of Z-shaped phase shift connection method, side-extended triangular phase shift connection method and hexagon phase shift connection method or the same method. Using different combinations of phase shift connection methods, different numbers of turns of main windings and phase shift windings can be obtained.

FIG. 9 shows part numbers of turns after phase shifting by ±18.75° using the side-extended triangular phase shift connection method and phase shifting by ±3.75° using the hexagon winding phase shift connection method. The actual phase shift angle and transformation ratio difference are shown in the following table.

| | | | | | | | |
|---|---|---|---|---|---|---|---|
| Side-extended triangle ±18.75° | Edgewise (phase shift) number of turns | 4 | 8 | 11 | 13 | 15 | 19 |
| | Triangular side (main) number of turns | 4 | 8 | 12 | 14 | 16 | 20 |
| | Actual phase shift angle | 19.11° | 19.11° | 18.48° | 18.58° | 18.66° | 18.74° |
| | Equivalent number of turns | 10.58 | 21.17 | 30.05 | 35.34 | 40.63 | 51.22 |
| Hexagon ±3.75° | Short side (phase shift) number of turns | 1 | 2 | 2 | 3 | 3 | 4 |
| | Long side (main) number of turns | 10 | 20 | 29 | 34 | 39 | 49 |
| | Actual phase shift angle | 4.72° | 4.72° | 3.30° | 4.19° | 3.67° | 3.89° |
| | Equivalent number of turns | 10.54 | 21.07 | 30.05 | 35.60 | 40.58 | 51.12 |
| Transformation ratio difference of number of turns (%) | | 0.45 | 0.45 | 0 | 0.72 | 0.12 | 0.19 |

As shown in the table, the transformation ratio differences of the number of turns between the axially split valve-side windings are all less than 1%, and the DC ring current generated by transformation ratio voltage difference can be controlled at a low value, so the impact on the load capacity of rectifier units is small.

Figure 16:
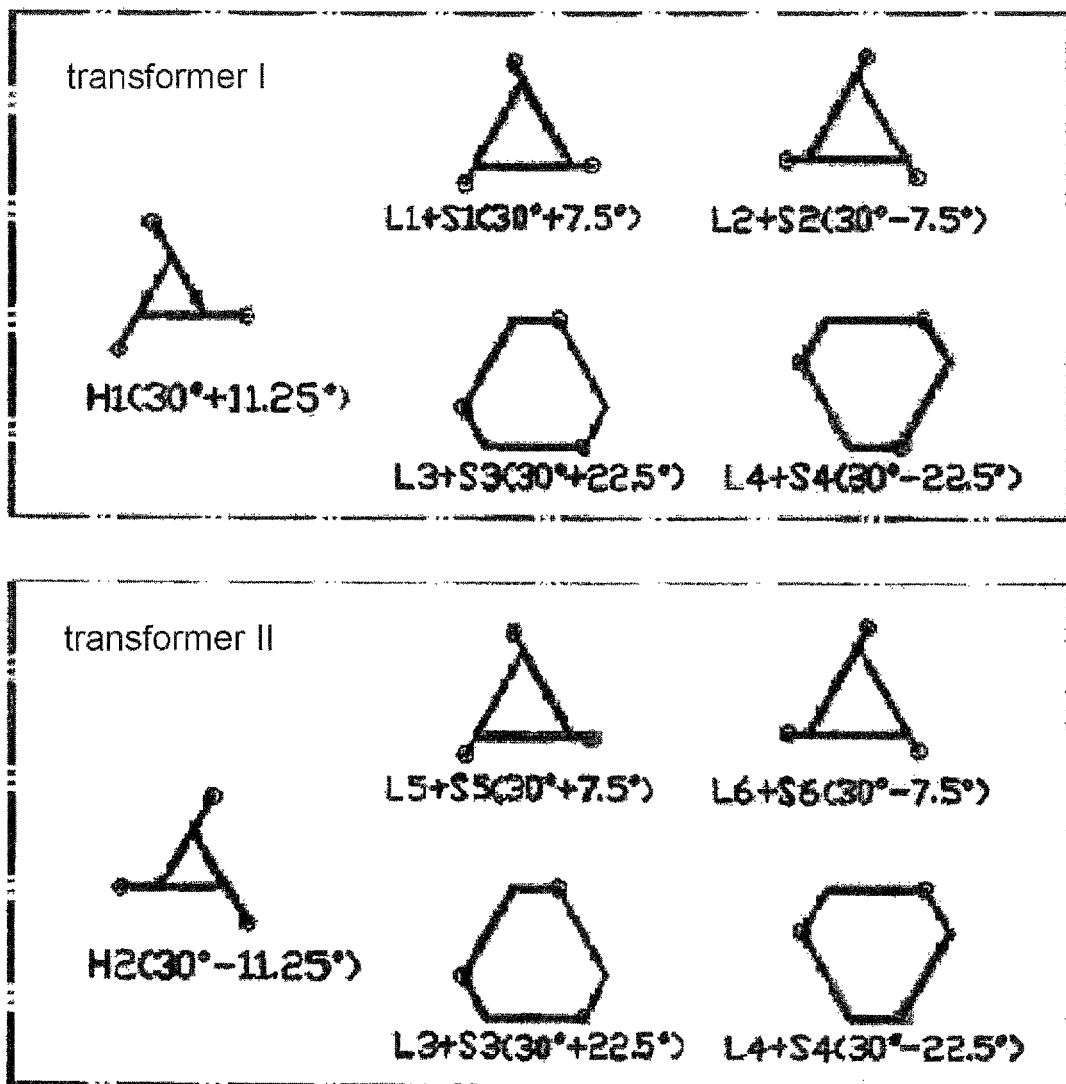
FIG. 16 is the schematic diagram of connection mode II of the windings of the 48-pulse rectifier transformer according to the invention.

FIG. 16 is the schematic diagram of connection mode II of the windings of the 48-pulse rectifier transformer according to the invention. FIG. 15 shows the two 24-pulse rectifier transformers with valve-side windings having a non-uniform symmetrical phase shift angle. The grid-side windings of the transformers are phase-shifted respectively and the phase shift angle among them is 22.5°. At this time, the uniform phase angle interval among the eight sets of valve-side windings is 15°; i.e., the electric angle interval of a single ripple of the 48-pulse rectification is 15°. As shown in FIG. 16, the windings are connected with rectifiers in parallel to form a uniformly symmetrical 48-pulse rectification.

Figure 17:
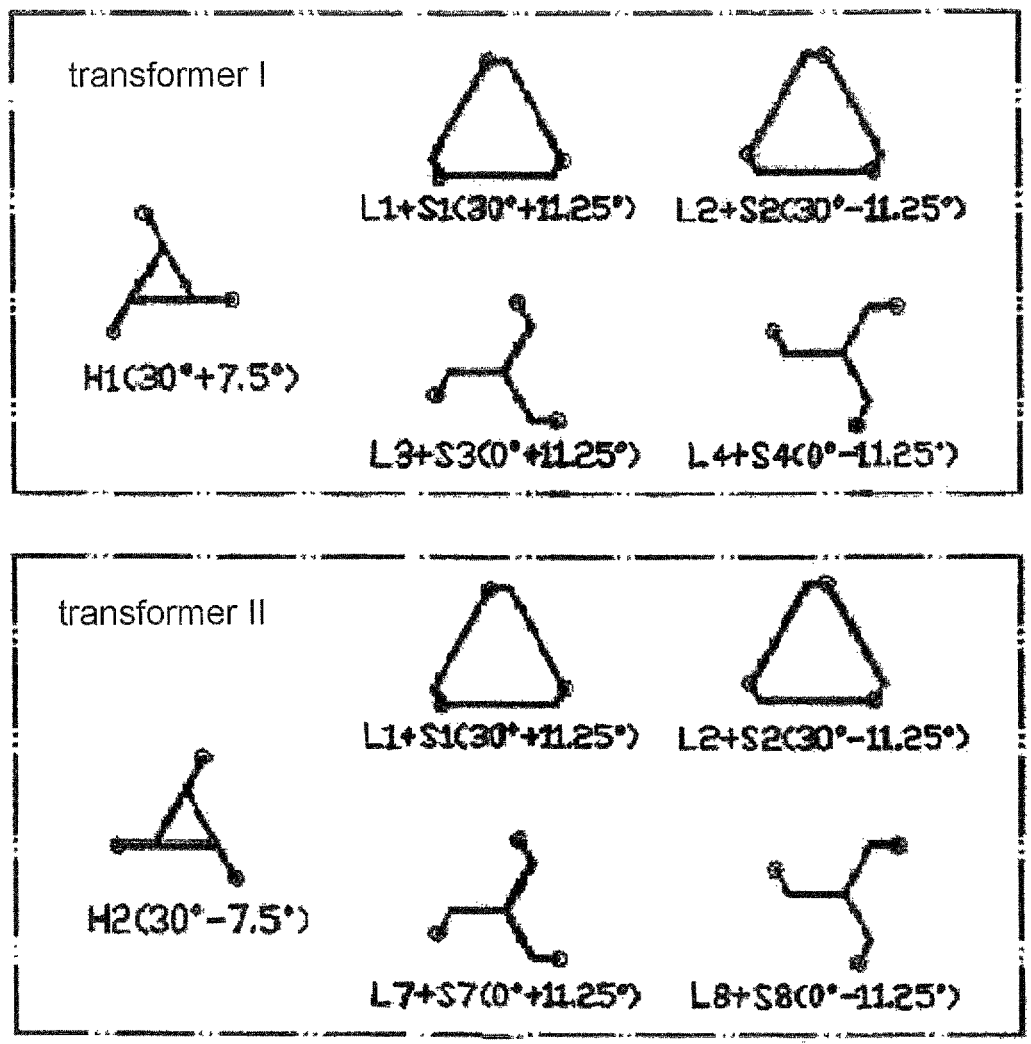
FIG. 17 is the schematic diagram of connection mode III of the windings of the 48-pulse rectifier transformer according to the invention.

FIG. 17 is the schematic diagram of connection mode III of the windings of the 48-pulse rectifier transformer according to the invention. FIG. 15 shows the two 24-pulse rectifier transformers with valve-side windings having a non-uniform symmetrical phase shift angle. The grid-side windings of the transformers are phase-shifted respectively and the phase shift angle among them is 15°. At this time, the uniform phase angle interval among the eight sets of valve-side windings is 22.5°; i.e., the electric angle interval of a single ripple of the 48-pulse rectification is 22.5°. As shown in FIG. 17, the windings are connected with rectifiers in parallel to form a uniformly symmetrical 48-pulse rectification.

Figure 18:
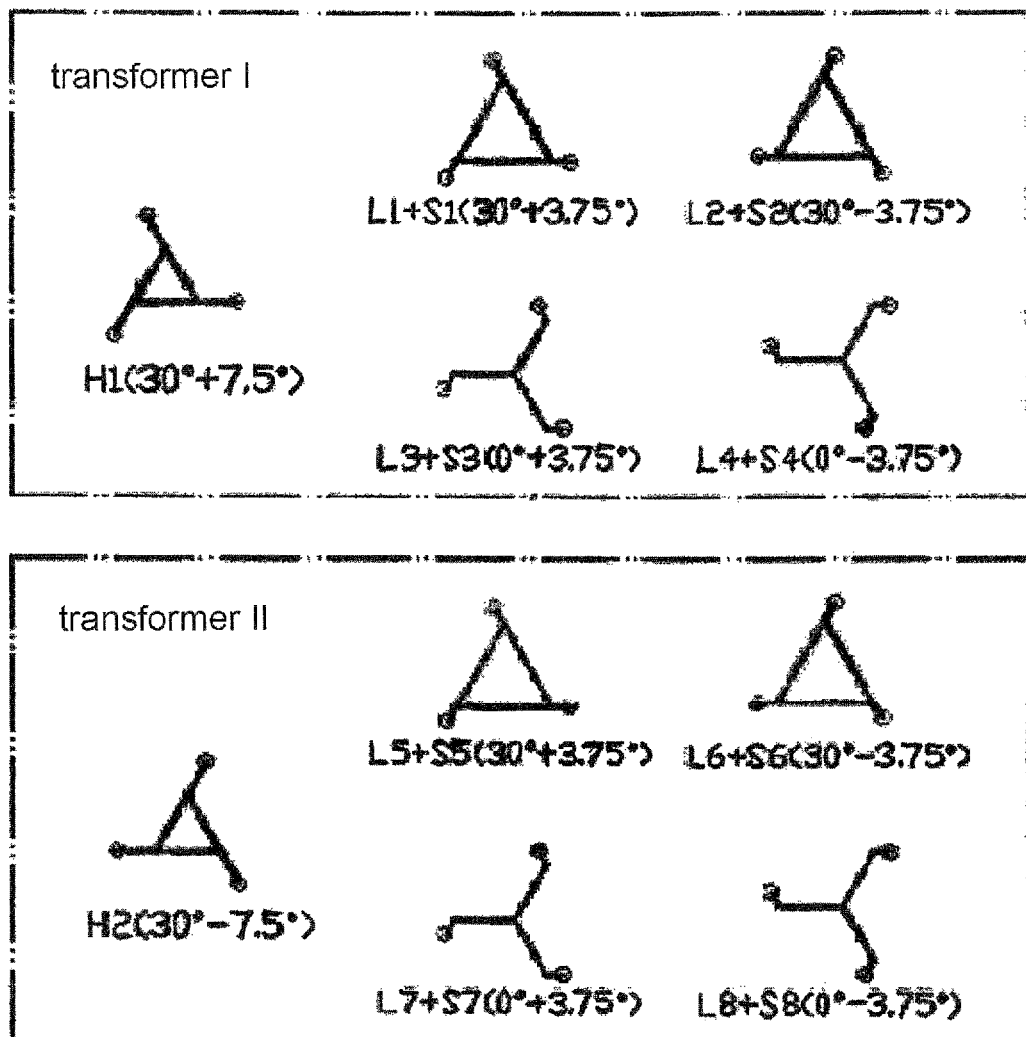
FIG. 18 is the schematic diagram of connection mode IV of the windings of the 48-pulse rectifier transformer according to the invention.

FIG. 18 is the schematic diagram of connection mode IV of the windings of the 48-pulse rectifier transformer according to the invention. FIG. 15 shows the two 24-pulse rectifier transformers with valve side windings having a non-uniform symmetrical phase shift angle. The grid-side windings of the transformers are phase-shifted respectively and the phase shift angle among them is 15°. At this time, the uniform phase angle interval among the eight sets of valve-side windings is 7.5°; i.e., the electric angle interval of a single ripple of the 48-pulse rectification is 7.5°. As shown in FIG. 18, the windings are connected with rectifiers in parallel to form a uniformly symmetrical 48-pulse rectification.

Figure 19:
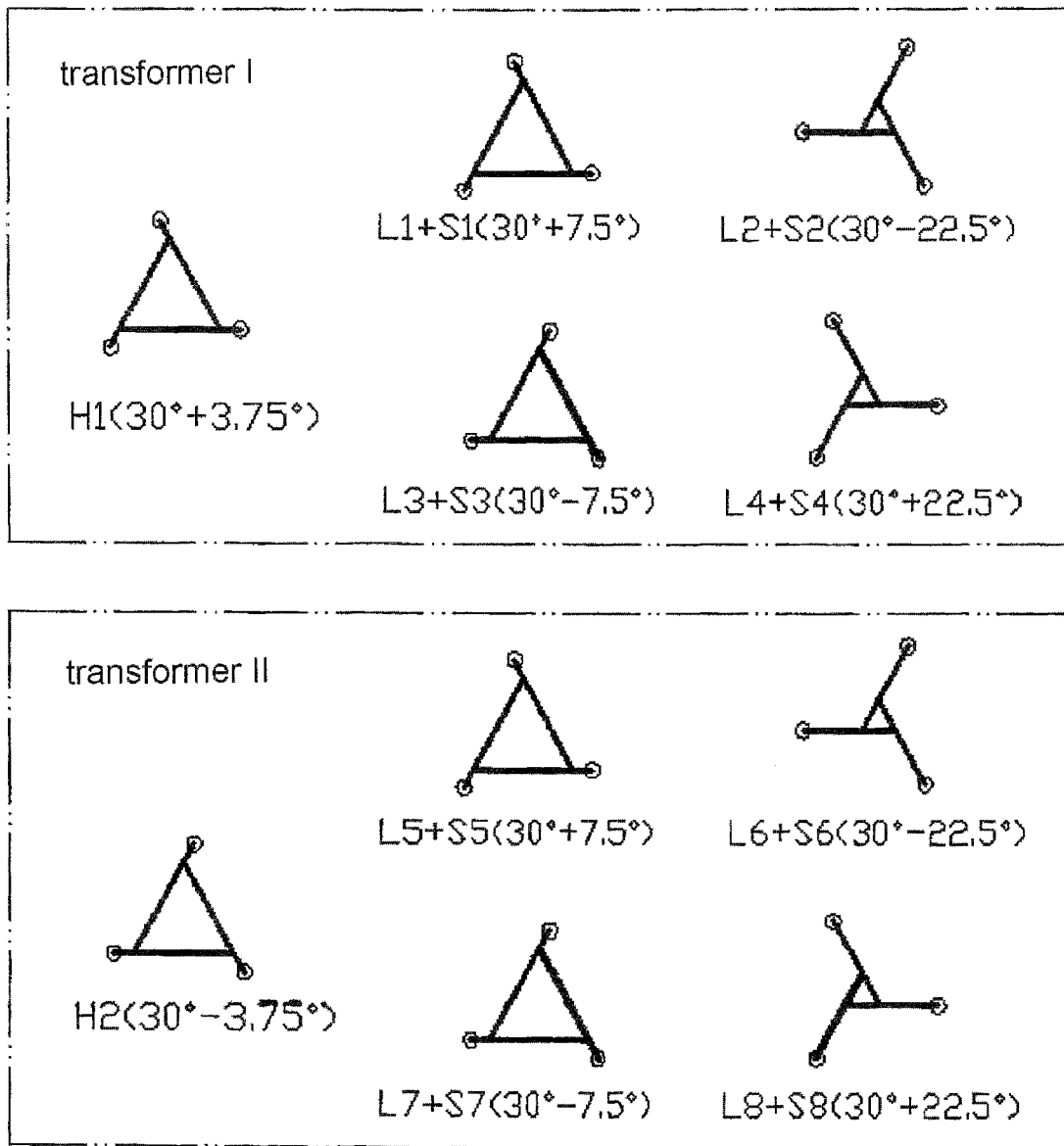
FIG. 19 is the schematic diagram of connection mode V of the windings of the 48-pulse rectifier transformer according to the invention.

FIG. 19 is the schematic diagram of connection mode V of the windings of the 48-pulse rectifier transformer according to the invention. FIG. 19 shows the three-phase 48-pulse rectifier transformers composed of the two rectifier transformers which are uniformly phase-shifted according to the connection method shown in FIG. 11. The grid-side windings of the two rectifier transformers use the side-extended triangular phase shift connection method and are phase-shifted by +3.75° and −3.75° respectively; and the grid-side windings are mutually phase-shifted by 7.5°. The mutual uniform phase angle interval among the eight sets of valve-side windings of the two rectifier transformers is 7.5°; i.e., the electric angle interval of a single ripple of the 48-pulse rectified voltage is 7.5°. In addition, if the grid-side windings are mutually phase-shifted by 22.5°, the mutual uniform phase angle interval among the eight sets of valve-side windings of the two rectifier transformers is also 7.5°. However, the quintuple and septuple harmonic currents generated by rectified current imbalance can be better counteracted on the grid-side.

Figure 20:
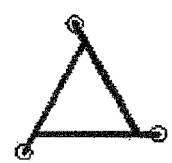
FIG. 20 is the schematic diagram of connection mode VI of the windings of the 48-pulse rectifier transformer according to the invention.
Figure 20:
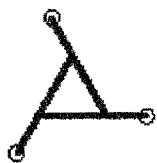
Figure 20:
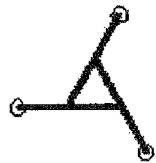
Figure 20:
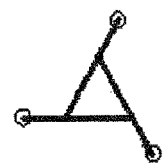
Figure 20:
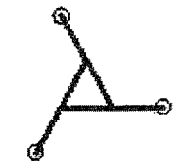
Figure 20:
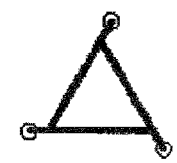
Figure 20:
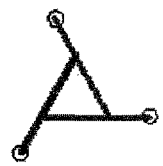
Figure 20:
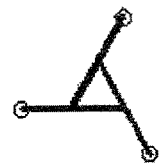
Figure 20:
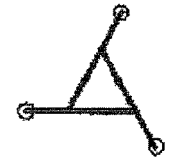
Figure 20:
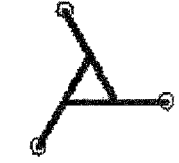

FIG. 20 is the schematic diagram of connection mode VI of the windings of the 48-pulse rectifier transformer according to the invention. FIG. 20 shows the three-phase 48-pulse rectifier transformers composed of the two rectifier transformers which are non-uniformly phase-shifted according to the connection method shown in FIG. 13. The grid-side windings of the two rectifier transformers use the side-extended triangular phase shift connection method and are phase-shifted by +7.5° and −7.5° respectively, and the grid-side windings are mutually phase-shifted by 15°. The mutual uniform phase angle interval among the eight sets of valve-side windings of the two rectifier transformers is 7.5°; i.e., the electric angle interval of a single ripple of the 48-pulse rectified voltage is 7.5°.

The common technical person in the art can understand that the above-described examples are only the preferred examples of the invention and are not used to limit the invention. The invention is detailed by referring to the previous examples, but the person skilled in the art can still modify the technical scheme recorded in each example described above or equivalently replace part of the technical features. Any modification, equivalent replacement, improvement, etc. within the spirit and principle of the invention shall be included in the protection scope of the invention.

The invention claimed is:

1. A three-phase 48-pulse rectifier transformer comprising two 24-pulse rectifier transformers with phase-shifted valve-side output windings, wherein:

each 24-pulse rectifier transformer includes two sets of grid-side input windings and four sets of valve-side output windings; the two sets of grid-side input windings are connected in parallel and arranged in an axially split manner; the two sets of valve-side output windings among the four sets of valve side output windings are corresponding radially arranged with one set of grid-side input winding in a split manner, and the other two sets of valve-side output windings are also corresponding radially arranged with the other set of grid-side input winding in a split manner; the two sets of valve-side output windings radially split mutually are arranged in an axially split manner with the other two sets of valve-side output windings radially split mutually;

the grid-side input windings of the two 24-pulse rectifier transformers are phase-shifted mutually, so that the uniform difference between the voltages of eight sets of valve-side output windings of the two 24-pulse rectifier transformers is 7.5°, and the eight sets of valve side output windings of the two 24-pulse rectifier transformers are corresponding connected with rectifiers to form a uniform 48-pulse rectifier transformer.

2. The three-phase 48-pulse rectifier transformer according to claim 1, wherein the four sets of valve-side output windings of the single 24-pulse rectifier transformer are phase-shifted symmetrically; each set of valve-side output windings includes main windings and phase shift windings; the number of turns of main windings between the corresponding radially arranged valve-side output windings is equal; the number of turns of phase shift windings is equal; and using the symmetrical phase shift connection method, the phase shift angle is equal but the direction is contrary.

3. The three-phase 48-pulse rectifier transformer according to claim 2, wherein that the voltage of the two sets of corresponding radially split valve-side output windings of the single 24-pulse rectifier transformer is equal and the mutual phase shift angle between them is 7.5°; the voltage of the other two sets of corresponding radially split valve-side windings is also equal and the mutual phase shift angle between them is 22.5°; the mutual phase shift angle among the four sets of valve-side output windings is 7.5°, 15°, 22.5° and 15° respectively; the phase shift angle between the axially arranged valve-side output windings is 15° or equivalent 45°; the transformation ratio difference in the number of turns of the axially split valve-side output windings is less than 1% on the premise that the number of turns of the main windings between the corresponding radially valve-side output windings is equal and the number of turns of phase shift windings is equal; and the mutual phase shift angle between the gird-side input windings of the two 24-pulse rectifier transformers is 30°.

4. The three-phase 48-pulse rectifier transformer according to claim 2, wherein that the voltage of the two sets of corresponding radially split valve-side output windings of the single 24-pulse rectifier transformer is equal and the mutual phase shift angle between them is 15°; the voltage of the other two sets of corresponding radially split valve-side windings is also equal and the mutual phase shift angle between them is 15°; the mutual phase shift angle among the four sets of valve-side output windings is 15°, 15°, 15° and 15° respectively; the phase shift angle between the axially arranged valve-side output windings is 15° or equivalent 45°; the transformation ratio difference in the number of turns of the axially split valve-side output windings is less than 1% on the premise that the number of turns of the main windings between the corresponding radially valve-side output windings is equal and the number of turns of phase shift windings is equal; and the mutual phase shift between the gird-side input windings of the two 24-pulse rectifier transformers is 7.5° or 22.5°.

5. The three-phase 48-pulse rectifier transformer according to claim 2, wherein the voltage of the two sets of corresponding radially split valve-side output windings of the single 24-pulse rectifier transformer is equal and the mutual phase shift angle between them is 22.5°; the voltage of the other two sets of corresponding radially split valve-side windings is also equal and the mutual phase shift angle between them is 22.5°; the mutual phase shift angle among the four sets of valve-side output windings is 22.5°, 7.5, 22.5° and 7.5° respectively; the phase shift angle between the axially arranged valve-side output windings is 7.5°; the transformation ratio difference in the number of turns of the axially split valve-side output windings is less than 1% on the premise that the number of turns of the main windings between the corresponding radially valve-side output windings is equal and the number of turns of phase shift windings is equal; and the mutual phase shift between the gird-side input windings of the two 24-pulse rectifier transformers is 15° or 45°.

6. The three-phase 48-pulse rectifier transformer according to claim 2, wherein that the voltage of the two sets of corresponding radially split valve-side output windings of the single 24-pulse rectifier transformer is equal and the mutual phase shift angle between them is 7.5°; the voltage of the other two sets of corresponding radially split valve-side windings is also equal and the mutual phase shift angle between them is 7.5°; the mutual phase shift angle among the four sets of valve-side output windings is 7.5°, 22.5°, 7.5° and 22.5° respectively; the phase shift angle between the axially arranged valve-side output windings is 22.5°; the transformation ratio difference in the number of turns of the axially split valve-side output windings is less than 1% on the premise that the number of turns of the main windings between the corresponding radially valve-side output windings is equal and the number of turns of phase shift windings is equal; and the mutual phase shift between the gird-side input windings of the two 24-pulse rectifier transformers is 15° or 45°.

7. The three-phase 48-pulse rectifier transformer according to claim 1, wherein the phase shift angle between the two sets of corresponding radially split valve-side output windings is 30°; the phase shift angle between the other two sets of corresponding radially split valve-side windings is also 30°; the phase shift angle between the axial split windings is 15° or 7.5°; and the difference in the voltage values of the four sets of valve-side output windings is less than 0.5%.

8. The three-phase 48-pulse rectifier transformer according to claim 7, wherein when the mutual phase shift angle of the axially split windings of the single 24-pulse rectifier transformer is 15°, the mutual phase shift angle among the four sets of valve-side output windings is 15°, 15°, 15° and 15° respectively and is uniformly equal; and the mutual phase shift between the gird-side input windings of the two 24-pulse rectifier transformers is 7.5° or 22.5°.

9. The three-phase 48-pulse rectifier transformer according to claim 8, wherein the two sets of corresponding radially split valve-side output windings are both phase-shifted connected, phase-shifted respectively; after phase shifted, the phase angle difference of the two sets of valve-side output windings is 30°; the other two sets of corresponding radially split valve-side output windings are both phase-shifted connected, phase-shifted respectively; and after phase shifted, the phase angle difference of the two sets of valve-side output windings is 30°.

10. The three-phase 48-pulse rectifier transformer according to claim 8, wherein the two sets of corresponding radially split valve-side output windings are connected in triangular shape and star shape respectively, and their mutual phase angle difference is 30°; and the other two sets of corresponding radially split valve-side output windings are both connected in side-extended triangular shape and phase-shifted by +15° and −15° respectively, and their mutual phase angle difference is 30°.

11. The three-phase 48-pulse rectifier transformer according to claim 7, wherein when the mutual phase shift angle of the axially split windings of the single 24-pulse rectifier transformer is 7.5°, the mutual phase shift angle among the four sets of valve-side output windings is 22.5°, 7.5°, 22.5° and 7.5° respectively and is not uniformly equal; and the mutual phase shift between the gird-side input windings of the two 24-pulse rectifier transformers is 15°.

12. The three-phase 48-pulse rectifier transformer according to claim 11, wherein the two sets of corresponding radially split valve-side output windings are both connected in side-extended triangular shape and phase-shifted by +11.25° and −18.75° respectively; and the other two sets of corresponding radially split valve-side output windings are both connected in side-extended triangular shape and phase-shifted by −11.25° and +18.75° respectively.

13. The three-phase 48-pulse rectifier transformer according to claim 11, wherein the two sets of corresponding radially split valve-side output windings are both connected in side-extended triangular shape and phase-shifted by +3.75° and −26.25° respectively; and the other two sets of corresponding radially split valve-side output windings are connected in side-extended triangular shape and phase-shifted by −3.75° and +26.25° respectively.

* * * * *